United States Patent [19]

Flaig

[11] 4,248,285
[45] Feb. 3, 1981

[54] SAFETY NUT AND METHOD FOR MAKING

[76] Inventor: Christian Flaig, Muehlstrasse 1, 7209 Aldingen, Fed. Rep. of Germany

[21] Appl. No.: 954,845

[22] Filed: Oct. 26, 1978

Related U.S. Application Data

[63] Continuation-in-part of Ser. No. 757,497.

[30] Foreign Application Priority Data

Apr. 7, 1976 [DE] Fed. Rep. of Germany ... 7610740[U]
Aug. 26, 1976 [DE] Fed. Rep. of Germany ....... 2638560

[51] Int. Cl.³ ............................................. F16B 39/38
[52] U.S. Cl. .................................... 411/246; 411/222; 411/260
[58] Field of Search ...................... 151/30, 21 R, 21 B, 151/14 CS, 25 A, 25 R, 15, 21 C, 14 R

[56] References Cited

U.S. PATENT DOCUMENTS

| 433,128 | 7/1890 | Howard | 151/21 R |
|---|---|---|---|
| 1,013,521 | 1/1912 | Swenson | 151/21 R |
| 2,213,353 | 9/1940 | Whitcombe | 151/21 R |
| 2,222,460 | 11/1940 | Crowley | 151/21 R |
| 2,275,993 | 3/1942 | Robertson | 151/30 UX |
| 2,386,307 | 10/1945 | Giles | 151/30 |
| 2,460,131 | 1/1949 | Kendrick | 151/30 |
| 3,233,262 | 2/1966 | Vollman | 151/21 R X |

FOREIGN PATENT DOCUMENTS

| 331926 | 9/1958 | Switzerland | 151/30 |
|---|---|---|---|
| 598800 | 2/1948 | United Kingdom | 151/30 |
| 761771 | 11/1956 | United Kingdom | 151/30 |
| 826469 | 1/1960 | United Kingdom | 151/30 |

Primary Examiner—Ramon S. Britts
Attorney, Agent, or Firm—Burns, Doane, Swecker & Mathis

[57] ABSTRACT

A safety nut comprises an axial extension in which an elastic safety element is disposed. In one embodiment the element comprises a wire spring clip whose legs are tangent to a central thread of the nut so that a bolt threaded onto the nut flexes the legs and creates a reactive clamping force. In another embodiment the elastic element comprises a spring disk having a thread which is axially offset at only a portion relative to the nut thread. A bolt tends to axial distort the disk and thereby creates an axial reactive force which clamps the bolt. During manufacture, the disk is threaded simultaneously with the threading of the nut and is thereafter deformed at at least one location to create the axial offset relationship between the threads.

2 Claims, 8 Drawing Figures

SAFETY NUT AND METHOD FOR MAKING

BACKGROUND AND OBJECTS

This application is a continuation-in-part of my co-pending application, Ser. No. 757,497, now abandoned, which was filed on Jan. 7, 1977.

This invention concerns a safety nut, e.g. a threaded nut which is secured against unscrewing itself when screwed over a threaded bolt, i.e., screwed in such a manner that the bolt passes through the nut axially. Heretofore, a safety nut has been equipped with a concentric safety zone adjoining the threaded section. An elastic safety element axially protrudes into the extension of the threaded section of the nut. The element is held frictionally by a neck stop of the nut. The usual kind of safety element consists of a plastic ring, into which the thread of the bolt cuts, when the nut is screwed onto it. For production purposes it is desirable that the plastic material is as stable as possible in its physical properties, which results in a loss in elasticity. A nut held in this kind of manner can offer only during initial use a certain amount of security against unwinding itself. Beyond this, most plastic materials loose their elasticity during long periods of intensive heating or may even shrink under these conditions, so that the nut will loose its safety properties.

The objects of this invention are to reduce the production of the nut to a purely metal oriented process, to immunize the safety properties of the nut from the influence of high temperatures, to produce a nut for repeated use, and especially to increase the overall safety of the device.

BRIEF SUMMARY

One solution of the afore-mentioned problems is achieved by a safety element designed as a wire spring clip, which is placed under tension in an annular groove at the extension of the nut, and wherein the insides of its legs are tangent to the threaded center of the nut. When a bolt is inserted, the legs are radially displaced and exert an inward holding force against the bolt.

The wire spring clip is highly insensitive to temperature influences and, as an advantageous further development, can be produced of non-rusting materials. But furthermore the spring clip will not be permanently deformed when the nut is screwed to a threaded bolt, but rather clamps the bolt between its two legs and against the bridge connecting the legs, so that the nut will not loose its self-securing properties even after repeated use.

It has proven useful to form the wire spring clip in such a way that the bridge connection bends in sharp angles to its legs and that the free ends of the legs will rest in the annular groove of the nut extension at a distance from each other. Thereby, it is achieved, that three sides of the wire spring clip are tangent to the threaded bolt in the center, while the clip is held at four points within the annular groove of the nut.

A second solution of the originally stated problem is found by the use of a safety element in the shape of a steel spring ring disk, whose edge is held in the annular groove of the nut extension. The disk is threaded at its inner rim in correspondence with the thread of the nut, but in such a way that the groove in the inner rim of the disk is cut axially at only a portion of the disk at a somewhat lower incline than the grooves of the nut. The disk is constrained to an axial movement relative to the nut of only a limited extent. By this process an especially high degree of security against an undesired loosening of the nut is guaranteed. By variation of the relative degree of incline between the thread of the nut and that of the portion of the ring disk, there exists a possibility to adjust the rigidity of hold as desired. The highest degree of rigidity is accomplished by varying the incline of about half a groove. Furthermore, the rigidity of hold may also be adjusted by varying the number and circumferential extent of the portion or portions of the disk thread which are cut at a somewhat lower incline than the grooves of the nut. The lower incline is most readily obtained by deforming only one or more portions of the disk as by pressing.

The present model of the invention is preferable for safety nuts which are subject to an extremely high stress, as for instance in vigorously viberating engines (tractors) or in other equipment subjected to a strong shaking motion. Hereby it is decisive, that the ring disk, held only by its outer edge, will have some degree of elasticity in its central area in an axial direction, whereby the screwing-in of the bolt is made possible and the screwed-in bolt is held tight. Test results have shown that the thread of the screw bolt is not damaged, even when the holding force is extremely high. This again allows for a repeated use of the nut. Finally and in addition, the spring steel ring disk acts as a gasket or seal and prevents the penetration of water, which could lead to a dangerous forming of iron. Both above-discussed versions have in common that the safety element will be subjected to an elastic distortion or warp in relation to the plane of the wire clip (or the ring disk) when the threaded bolt is screwed into the nut, whereby the restoring force of the safety element against itself and the bolt represents the holding force.

THE DRAWINGS

The drawings show preferred examples of alternate versions of the invention wherein.

DETAILED DESCRIPTION

Figure 1:
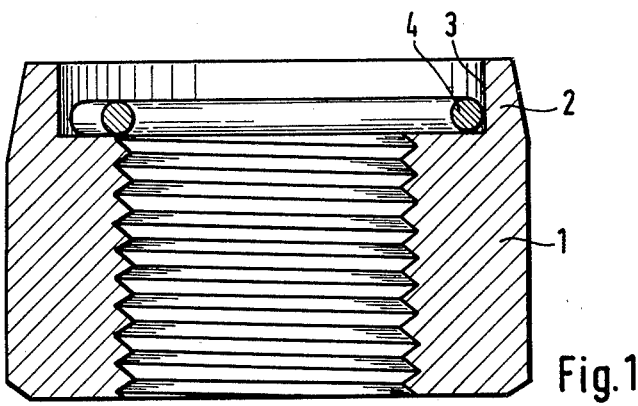
FIG. 1 is a vertical or longitudinal sectional view of a first form of safety nut according to the invention during an intermediate stage of its production, taken along line A, B of FIG. 2.
Figure 2:
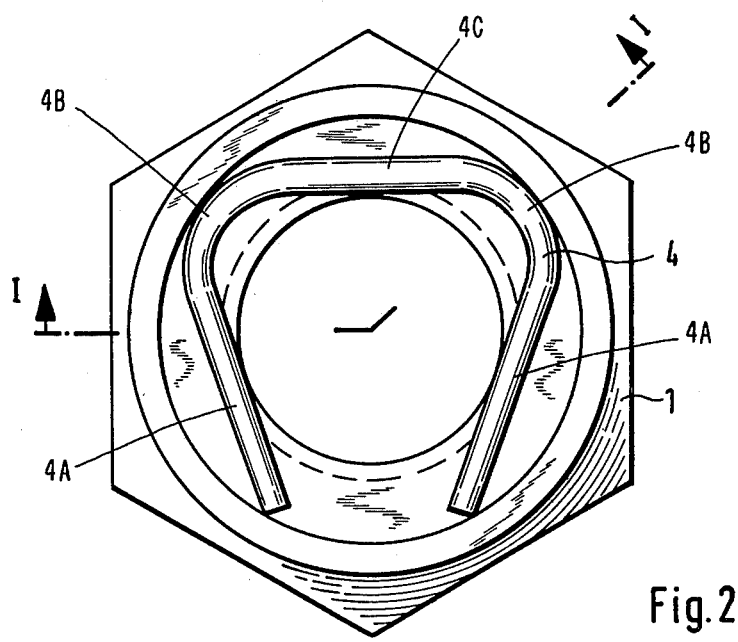
FIG. 2 is a top view of the nut of FIG. 1.
Figure 4:
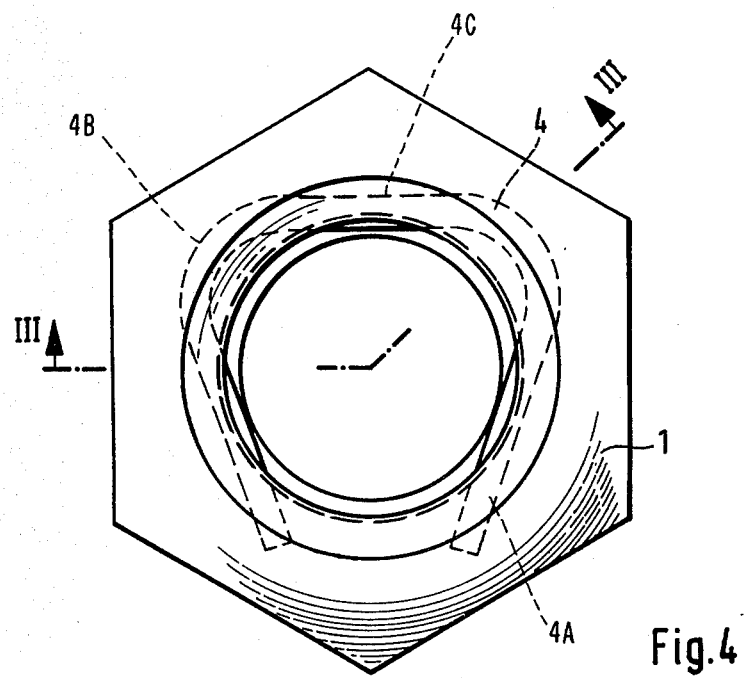
FIG. 4 is a top view of the finished nut of FIG. 3.

The normal body 1 of a hexagon nut (FIG. 1) is extended concentrically and co-axially at one end 2, whereby the inner rim of the extension is cut somewhat wider than the thread of the nut and creates an opening 3. A wire spring clip 4 is placed into this opening 3. The spring clip 4 includes two slightly separated legs 4A and two relatively sharp i.e., acute angles 4B, connecting the bridge or bight portion 4C of the clip with its legs. The ends of the legs bear against the extension 2 of the nut. The production of a blank nut (i.e., unfinished) as shown in FIG. 1 can be accomplished by familiar means, known to the expert. The legs 4A and the bridge 4C lie in the axial path of the bolt threads when the latter is screwed-in, and are tangent relative to the central threads of the nut, when viewed axially as in FIG. 4.

Figure 3:
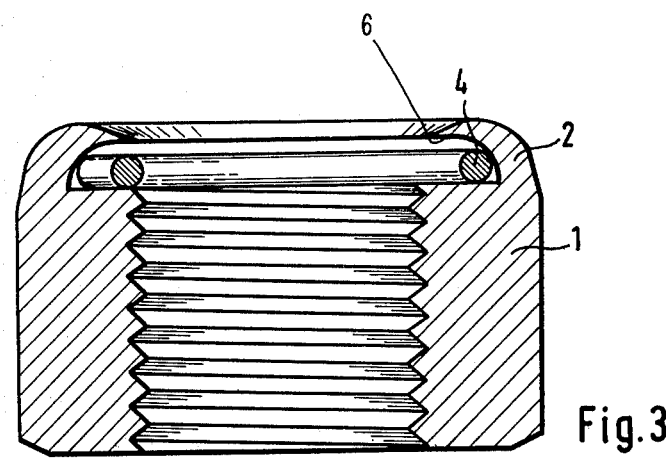
FIG. 3 is a vertical section, comparable to FIG. 1 through the nut along line A, B of FIG. 4 when in its finished form.

FIG. 3 shows the completed nut after the outer rim of the extension 2 has been deformed inwardly against the wire clip 4. In this manner, the wire spring clip 4 now rests in an annular groove 6, so as to be rendered axially immobile. None the less, the position of the wire spring clip remains unaltered in relation of the grooves of the nut, so that a threaded bolt will be held at three points by the clip, when it is screwed into the nut.

That is, when a bolt is screwed into the nut, it is contacted at three points by the spring clip, i.e., tangentially along both legs 4A and the bridge 4C. Since the legs of the spring clip will be flexed radially outwardly by the oncoming bolt, there will be a radially inward bias or clamping force imposed against the threads of the bolt at these three points. Consequently, inadvertent loosening of the nut is resisted. During this screwing process the wire spring clip has to withstand an axial distortion, while it is arrested in a vertical plane to the axis of the nut. If the nut, which will not loosen itself due to the clamping forces evoked by the above mentioned occurrences, is screwed off in a normal manner, the safety element will basically resume its plane surface form i.e., regular configuration and has therefore not lost its securing properties for future use.

The wire spring clip can just as easily be made of a wire with a non-circular cross-section, a so-called sectional or shaped wire.

In a modified version shown in FIGS. 5 to 8 the body 21 of a hexagon nut has been extended concentrically and co-axially to form an extension 22 at one end. The inner rim of the extension 22 is cut somewhat wider than the thread of the nut and creates an opening 23. Into this opening 23 a spring steel ring-shaped disk 24 is inserted. The disk 24 is formed by removing three segments from its outer circumference, as can be seen well in FIG. 6. The remaining circumference areas rest symetrically within the opening 23 and against the walls of the opening of the extension 22. The production of the blank nut shown in FIG. 5 can be accomplished in the usual manner, known to the expert. At the production stage shown in FIGS. 5 and 6 the blank has not yet been threaded.

Figure 6:
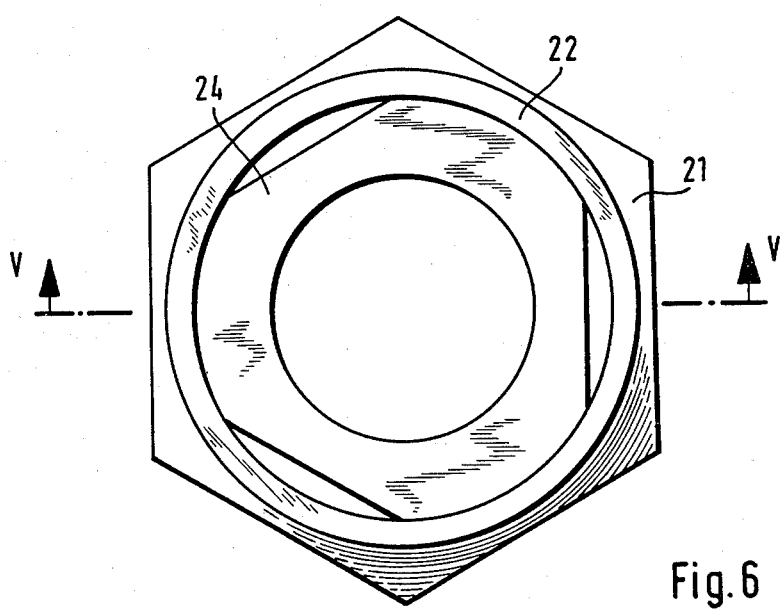
FIG. 6 is a top view of the nut of FIG. 5.
Figure 7:
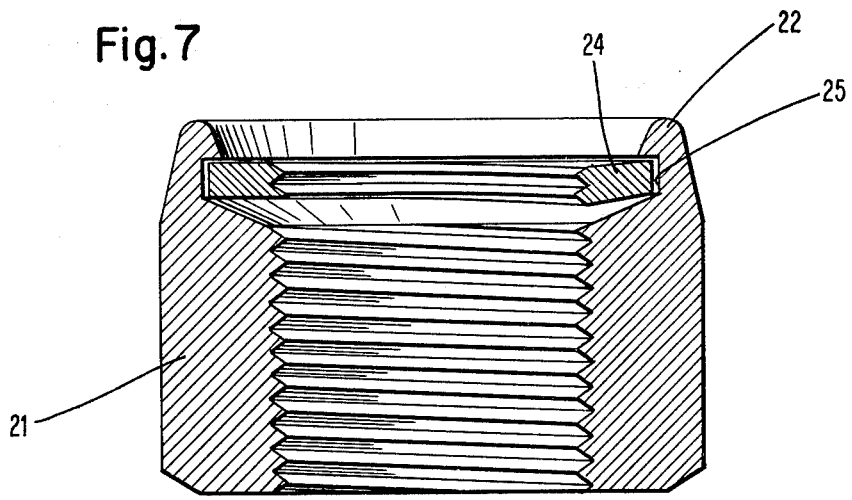
FIG. 7 is a comparable section as in FIG. 5 through the nut along line A, B of FIG. 8 when in its finished form, and, FIG. 8 is a top view of the finished nut of FIG. 5.

FIG. 7 shows the finished version of the nut of FIG. 6 wherein the end of the extension has been bent atop the disk 24, so that the ring disk 24 now is constrained to a limited axial movement in an annular groove 25. After thus attaching the disk 24, a thread is now cut into the center of the nut in the traditional manner. Since the ring disk has the same interior diameter as that of the nut body 21, the tool also cuts an identical thread into the disk 24 as into the nut. Finally, at the conclusion of the cutting process, a printing stamp or a similar device presses only a portion of the inner area of the ring disk 24 slightly toward the thread of the nut, i.e., axially inwardly, for example, at three defined points which are symmetrical to each other, so that the disk 24, as best can be seen in FIG. 7 becomes deformed. The inner area of the ring disk 24 may be pressed by these punches or the like so that the disk 24 will now have three cambers which are located within the area of the cut off segments as viewed in the radial direction. The result of this deformation is that the nut thread and a portion of the thread at the inner rim of the disk 24 are offset axially by the degree of the deformity. The depressed portion of the thread extends at an angle relative to the nut axis in proportion to the amount of distortion and the disk will have a wave like configuration as a result of the pressing of the disk 24.

It is useful to work with a ring disk whose thickness corresponds with the pitch of the nut thread. The deformity or depression of the portion of the disk should equal about ¼ to ½ of a pitch, so that the partial distortion of the two threads against each other equally represents between ¼ to ½ of a groove. Thus, the portion of the disk thread will be displaced axially toward the nut thread by ¼ to ½ of the thread pitch. When a bolt is inserted into the nut it will, upon engaging the portion of the disk thread, tend to urge the entire disk toward a flat or horizontal condition, i.e., tend to re-orient the depressed portion of the disk thread so that its pitch is axially non-offset relative to that of the nut thread. Due to the inherent bias present in the disk portion as a result of its having been deformed, it will elastically resist such re-orientation and exert an axial bias against the bolt thread.

The threaded bolt (not shown in the drawings) would be clamped firmly by the ring disk as it is screwed through the nut, whereby the reactive axial spring tension of the disk is responsible for the clamp force. In the given example of a ring disk 24, the clamp force is most intense when the distortion, or axial offset, of the portion of the threads is about ½ of a pitch. Through the process of a suitable selection of materials for the ring disk, its thickness and its distortion and as a result of the magnitude as well as the number of pressings of the disk, considerable clamp forces can be produced, and all this without damaging the thread of the screwed-in bolt. Beyond this, it is advantageous, that the amount of clamp force can be controlled by simply altering the degree of distortion of the portion of the disk as a result of pressing, and that the ring disk acts also as a seal against the penetration of water.

Figure 5:
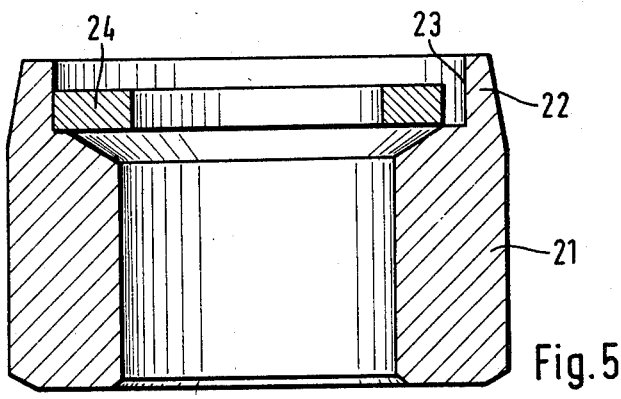
FIG. 5 is a vertical section similar to FIG. 1 through a second version of the safety nut during its production, taken along line A, B of FIG. 2.
Figure 8:
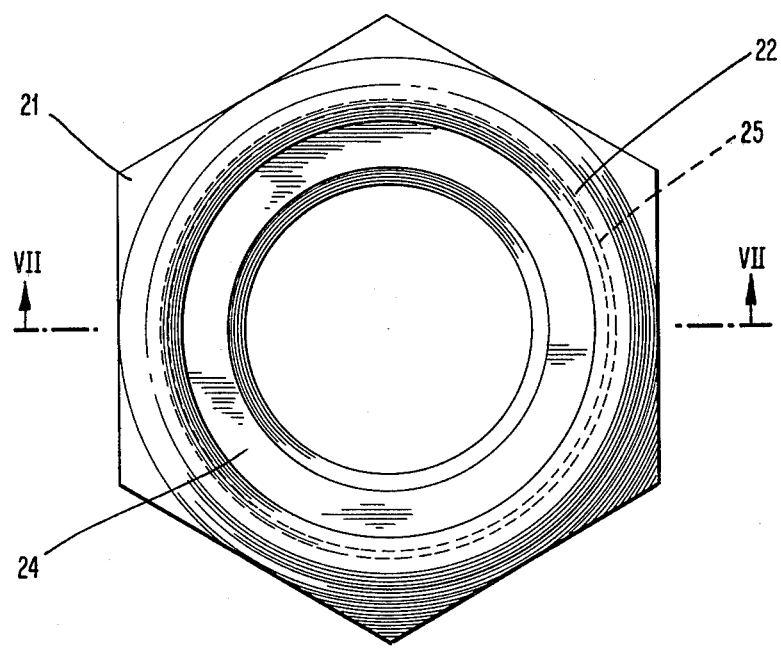

The modified version shown in FIGS. 5 and 8 can undergo a number of changes. For instance, it is possible to press the circular disk 24 at less than or more than three points. For example, the use of only two points has produced desirable results. Furthermore, even one point of pressing may be sufficient although typically better results are obtained with a greater number of points. It is essential, however, to produce a wavy configuration in the disk 24 as a result of pressing at at least one point of the disk 24.

In order to insure that the elastic force is obtained, it is essential that the circular disk 24 is not clamped down too tightly by the shrinking of the upper end of the neck extension 22. Accordingly, the disk is provided with at least a slight amount of looseness in the axial direction so that the circular disk 24 will be able to "breathe" or move slightly within the groove. This arrangement can be accomplished by bending the upper end of the neck extension 22 by only 90° and by not exerting any axial pressure onto the turned end of the neck extension 22 either before or after the one or more pressings are made into the circular disk. In this way, the disk is constrained to a limited axial movement relative to the nut.

It is also feasible to insert an originally corrugated circular disk into the groove, and then to cut the thread. The disk is then pressed into a flattened or horizontal condition. This produces an axial offset relationship between the nut thread and the now wavy or corrugated portions of the disk thread, whereby the bolt will axially deform the disk to impart the necessary axial reactive forces for clamping. It is furthermore plausible, that the circumference of the ring disk can have a multitude of different shapes. However, a non-circular circumference seems preferable, since the elasticity during the distortion is facilitated. It is also conceivable to reduce the thickness of the ring disk at the central edges to increase the elasticity. Possibly the outer rim area of the ring disk could have a large number of small cut-out sections. Spring band steel is particularly recommendable as the material for the ring disk, but other materials can be used as well.

The problem, to which this invention addresses itself, can also be solved by cutting a thread, corresponding with the nut thread, into the inner rim of the flat ring disk from bottom to top without cutting completely through the disk. This can be accomplished during the cutting of the thread of the nut, by leading the thread cutting tool only with its tip into the ring disk. By virtue of such an arrangement of the invention, whereby the ring disk thread is not completed, it becomes unnecessary to produce an axial distortion against the nut thread by a subsequent pressing process since the bolt itself will distort the disk and create the axial clamping forces.

The invention can be used for screw nuts of all thread types, as well as in those cases, where the nut is an integral component of a unit, for example an engine block.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A safety nut including a threaded portion and a safety portion extending coaxially therebeyond, said safety portion including an opening having a circular inner wall; an elastic, circumferentially endless disk situated in said opening of said safety portion; said disk formed of spring steel and having a non-circular outer periphery bearing against said inner wall of said opening at circumferentially spaced locations; said disk being arranged for limited axial movement in said opening relative to said nut; an inner portion of said disk including a threaded aperture aligned with a threaded passage in said threaded portion of said nut and being engageable with a bolt threadedly inserted into said nut; the thickness of said inner portion of said disk being substantially the same as the pitch of the nut thread; at least one but not all portions of said disk being deformed to axially offset a corresponding portion of said disk thread relative to said nut thread by an amount within the range of one-quarter to one-half of the pitch of the latter so that said axially offset portion is elastically deflected by an inserted bolt to axially clamp the bolt in place.

2. A safety nut according to claim 1 wherein said deformed portion of the disk threads is oriented at an acute angle relative to the nut axis and to the nut threads so that a bolt tending to return said portion of the disk threads to a non-offset relationship distorts said disk threads to eliminate said angular relationship and thereby exert an axial bias on the bolt.

* * * * *